Figure 2:
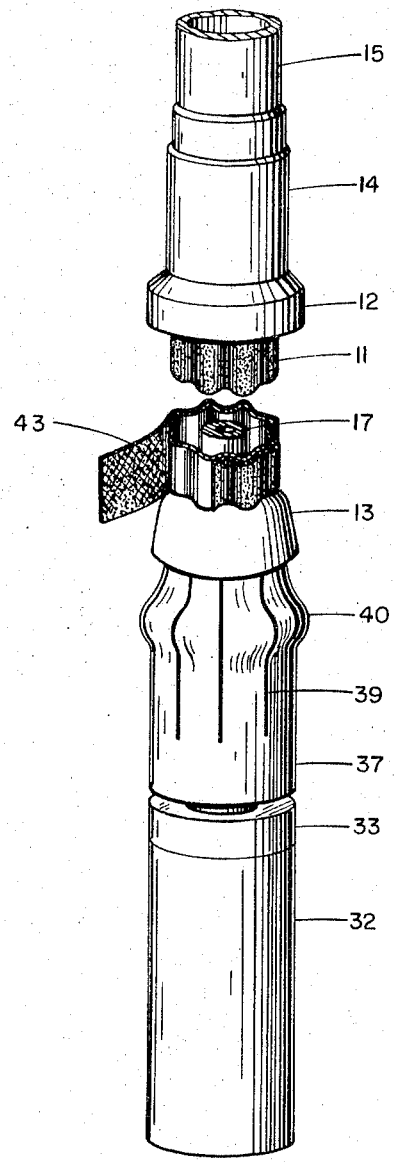

Jan. 10, 1967 E. R. JENNINGS 3,297,092
CASING PATCH
Filed July 15, 1964

INVENTOR.
EARL R. JENNINGS
BY *Buell B. Hamilton*

ATTORNEY 3,297,092
CASING PATCH
Earl R. Jennings, Tulsa, Okla., assignor to Pan American Petroleum Corporation, Tulsa, Okla., a corporation of Delaware
Filed July 15, 1964, Ser. No. 382,729
16 Claims. (Cl. 166—207)

This invention relates to placing steel liners in well casing, pipelines and the like. More particularly, it relates to improved material, apparatus and technique for facilitating the placing of such liners in pipelines and particularly in high-temperature wells.

In U.S. patent application S.N. 216,949, and now Patent No. 3,179,168, filed by R. P. Vincent on August 9, 1962, an apparatus, method and liner tube are described for lining cylindrical vessels. The apparatus, method and tube are now in commercial use. The tube is corrugated and coated with a glass fibe mat filled with a settable resin. The tube is then lowered into the well to the level to which a liner is desired and is reformed into cylindrical shape. The resin is then set to a hardened state.

One problem has arisen in deep, high-temperature wells. It has been difficult to select a catalyst which will cause the plastic to set in a reasonable time at the high temperature without at the same time running a risk of premature setting of the resin to a hardened state. Some means of avoiding this uncertainty is desirable.

A time-consuming and disagreeable part of the Vincent process involves mixing the resin and catalyst at the well head immediately before a casing-lining job and applying the mixture to the glass fiber mat surrounding the corrugated tube before the assembly is lowered into the well. A way of avoiding this process is also desirable.

The rigidity of the set plastic is an advantage in many applications. In others, such as in pipelines, there is considerable vibration and flexing. In these cases the rigidity of the set plastic is a disadvantage since the plastic may crack.

With the above problems in mind an object of this invention is to provide a method, apparatus and corrugated liner tube which can be used in applications such as pipelines and high-temperature wells with more certainty. Another object is to provide a pre-coated, corrugated liner tube, the use of which avoids the necessity of the mixing and coating operation at the well head. Still other objects will be apparent from the following description and claims.

In general I accomplish the objects of my invention by precoating the corrugated tube with a glass fiber mat filled with a mixture of a certain type of resin, including particles of a malleable solid such as walnut shells, copper or the like. The resin is a thermo-plastic resin which is hard at surface temperatures, but which has a softening point slightly below the temperature of the well at the level where the liner is to be set.

Such a tube can be prepared in the following manner at a central location, for example at the plant where the metallic liner tube is corrugated and annealed. The resin is first melted, then particles of a malleable material are stirred in and the mixture is applied in a coating of uniform thickness to the fiberglass mat which is carried on the exterior surface of the corrugated tube. The mat may, of course, be first filled with the resin at a temperature above the softening point of the resin, and this filled mat can then be applied to the outer surface of the corrugated tube, if this technique is preferred. The coating is then allowed to cool and solidify. The coated tube can be stored indefinitely until need for it arises. The softening temperature can be stamped on the tube for future reference.

Figure 1:
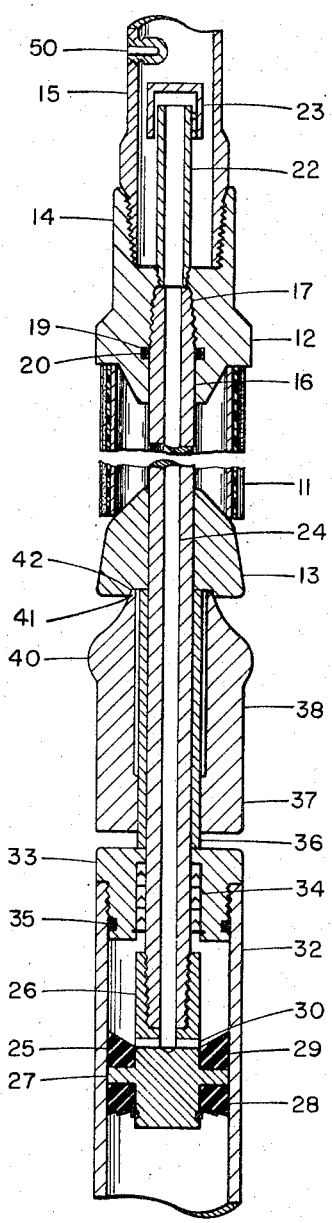

In the drawing FIGURE 1 is a view in cross-section of a preferred form of the apparatus used for setting the liner. FIGURE 2 is an isometric view, partly in section, showing the form of the coated, corrugated liner tube.

The tube may be set in a well using the apparatus shown in the drawing or any of the other apparatus described in the Vincent patent application. The over-all apparatus differs from that in Vincent, of course, in the nature of the coating on the corrugated tube. The method differs from that in Vincent in the nature of the resin and in the absence of the necessity of setting the resin.

In FIGURE 1, the corrugated liner tube 11 is mounted between connector 12 and an expanding cone 13. The connector 12 includes a top collar portion 14 which is internally threaded to receive standard well tubing 15 which serves to lower the entire liner setting assembly into the well. Other hollow conduit, such as drill pipe can, of course, be used, if desired. The main body portion of connector 12 includes a central passage 16, the upper portion of which is threaded to receive and hold the top of a polished rod 17. A complete seal between the polished rod and connector 12 is assured by use of O-ring 19 in peripheral groove 20 around passage 16. In the top of passage 16 a short pipe 22 with loose cap 23 is provided to prevent scale, dirt, and the like from the inside wall of the tubing from falling into the hydraulic system below.

Polished rod 17 includes a central bore 24 which connects with the interior of pipe 22. A piston 25 is mounted on the bottom of polished rod 17. The piston includes an internally threaded cap 26 for attachment to the externally threaded bottom portion of polished rod 17. The piston also includes flange 27 on which resilient cups 28 and 29 are mounted. Above top cup 29, a passage 30 is provided in the piston which is connected to the inner bore 24 of polished rod 17.

Piston 25 works in a cylinder 32 having a cap 33 through which polished rod 17 passes. Packing 34 is provided to form a seal between polished rod 17 and cap 33. Preferably, an O-ring 35 is provided between the cylinder 32 and cap 33 to insure a good seal between these members. Sleeve 36 rests on the top of cap 33 and supports expanding cone 13. Surrounding sleeve 36 is collet head 37 with collet spring arms 38. The arms have an inner surface which is spaced from sleeve 37 to permit inward movement of the arms. The arms also have slots 39 (FIGURE 2) between them to permit this same action. Near the tops of arms 38 are outwardly enlarged portions 40 which perform the final forming action to force the corrugated liner into a substantially cylindrical shape as the cone and collet head are pulled through the corrugated liner tube by the hydraulic piston and cylinder arrangement shown. Arms 40 are normally sprung out farther than shown in FIGURE 1. In this figure, the arms are shown as being restrained by projecting portions 41 which fit into a mating recess 42 in expanding cone 13. This permits lowering the assembly more easily through the well to the desired location.

In FIGURE 2, an exterior view, partly in section, is presented to show more clearly the form of the corrugated liner tube and the spring arms of the collet head. The coating 43 of glass fiber mat filled with resin on tube 11 is also shown in FIGURE 2.

In operation, the liner setting tool is assembled at the surface, as shown in FIGURES 1 and 2. The assembly is lowered into the well in this condition to the location at which the liner is to be set. A liquid, such as oil, is then pumped into the tubing. The oil passes through the well tubing, pipe 22, polished rod 17, passages 30 and into the cylinder 32 above piston 25. As the pressure increases, the pressure on cap 33 causes it to rise, carrying sleeve 36 and expander head 13 upwardly with respect to the polished rod. Upward movement of liner tube 11 is restrained by connector 12 attached to the top of the polished rod. Therefore, as expanding cone 13 rises, it partially expands corrugated liner tube 11.

As cone 13 passes upwardly through liner tube 11, the bottom of the tube eventually strikes the enlarged portions 40 of the collet head spring arms. When this happens, upward motion of the collet head is restrained and causes projections 41 to pull out of restraining recess 42. The arms then spring outwardly. As cap 33 on the hydraulic cylinder continues to rise, the cap comes in contact with the bottom of collet head 37, forcing it through liner tube 11. The spring arms complete the expansion of the liner tube out against the inner surface of the casing, except of course, for the sealing layer of glass fibers and resin between the liner and casing.

When the upward movement of cap 33, collet head 37, and expanding cone 13 causes cone 13 to come into contact with connector 12, the upward motion must, of course, stop. This is indicated by an increase of pressure required to inject liquid into the tubing. The expanding cone 13 and collet head 37 may then be forced the remaining distance through the corrugated liner tube by simply lifting on the well tubing. This is possible because the frictional drag of the expanded portion of the liner against the casing is sufficient to hold the liner down against the upward pull of the cone and collet head. It has been determined, for example, that the liner will resist a pull 12,000 pounds per inch of length of ⅛ inch thick liner set in 5½ inch casing. The upward force required to pull the expanding cone and collet head through the ⅛ inch thick liner in the 5½ inch casing varied from about 15,000 to about 60,000 pounds, depending upon weight of casing, heavier casing being smaller in internal diameter. It will be apparent that after only a few inches of the liner have been expanded against the casing, connector 12 is no longer needed to hold the liner down while the tube is being expanded.

An alternative procedure when cone 13 strikes connector 12 is to release the pressure on the tubing, raise the well tubing two or three feet, secure it firmly at the surface, and then resume injecting hydraulic fluid into the tubing. Raising the well tubing will lift connector 12 two or three feet above the top of the liner. Expanding cone 13 and collet head 37 can then be forced on through the liner tube by injecting hydraulic fluid through the tubing.

As soon as the cone and collet head have been pulled completely through the liner, the tubing and liner setting assembly are removed from the well. To avoid pulling a wet string, it is possible to include a break-off relief seal 50 in the well tubing 15 above cap 23. This seal can be broken off by dropping a go-devil down the tubing. Breaking of the seal allows the liquid in the tubing to leak out as the tubing is pulled from the well.

In Vincent's method the resin hardens. In my method, however, it does not. Instead, my resin remains soft. It does not flow away because of the highly compressed glass threads in all flow paths. Any small openings in such compressed threads are sealed by the particles of malleable material in the resin. As a result, the seal between the casing and liner will withstand a high differential pressure substantially without flow even though the resin remains soft.

The preferred resin is an epoxy resin in its uncatalyzed or unmodified thermoplastic state. That is, it is a ploymer formed between epichlorohydrin and bisphenol, but without a cross-linking agent or other catalyst. The polymerization is carried to a point where the resin is solid at surface temperatures of at least about 120° F. The polymerization is stopped, however, while the resins will still soften at the temperature of the well at the level where the casing liner is to be placed. This softening temperature will, of course, vary depending upon the geographical location and depth of the well.

The degree of softness of the resin can lie within rather wide limits. To be satisfactory it must be soft enough at the level of the well where the liner is set to flow without shattering, but it must be sufficiently viscous or have sufficient get that it will not run off the liner tube before the tube is expanded. Preferably, the resin should be as viscous as possible to reduce the chances of flow through the glass mat compressed between the liner and casing. In the case of epoxy resins, those resins can be used which have an ASTM ball and ring softening point of no more than about 30 or 40 degrees Fahrenheit above the well temperature at the level where the liner is set and will not run off the corrugated liner tube.

Since the solid epoxy resins are usually somewhat brittle, it is generally advisable to include a small amount of a plasticizer, such as an epoxy ester, to improve toughness and flexibility. This prevents breakage of the epoxy film on the corrugated tube during storage, handling, and running into the well. Some preferred compositions are included in the following table:

| Resin | Parts by Weight | Useful Range, ° F. |
| --- | --- | --- |
| Low-Melting Epoxy | 100 | 100 to 150. |
| Plasticizer | 10 | |
| Low-Melting Epoxy | 70 | 145 to 220. |
| High-Melting Epoxy | 30 | |
| Plasticizer | 10 | |
| Low-Melting Epoxy | 10 | 210 to 320. |
| High-Melting Epoxy | 90 | |
| Plasticizer | 10 | |
| High-Melting Epoxy | 100 | 300 to 360. |
| Plasticizer | 10 | |

For low temperature wells a low-melting epoxy resin, such as that sold under the trademark Epi-Rez 520–C, may be used. The lowest melting range mixture shown in the table consists of 100 parts of this resin, plus 10 parts of a liquid epoxy resin plasticizer; sold under the trademark Araldite DP–437. The mixture is a tough, flexible solid at temperatures below about 100° F. The mixture is sufficiently soft to flow without shattering under high pressure, but is not sufficiently soft to run off a corrugated liner tube coated with the resin.

At the other extreme in the table is a high-melting resin composition made up of a high-melting unmodified epoxy resin sold under the trademark Epi-Rez 560 and Araldite DP–437. This mixture again is a tough, flexible material even at low temperatures. It remains sufficiently viscous for use even at temperatures up to about 360° F.

Between the two simpler mixtures included in the table are two with intermediate useful ranges. It will be apparent that by use of the four compositions shown in the table, it is possible to operate in wells with temperatures from 100 to 360° F.

The upper limit of the temperature ranges of all the compositions can be extended by adding a few percent of a very finely divided solid, such as silica flour to increase the resistance to flow at high temperatures. The silica flour also aids in preventing flow of the resin through the compressed threads or rovings of the glass fiber mat.

The epoxy resins have the advantage of slowly polymerizing at high temperature so that their viscosity increases. This, of course, further reduces the tendency of the resin to flow from between the liner and casing. It will be apparent to those skilled in the art, however, that other synthetic resins can be used. These include the non-crystalline hydrocarbon polymers, such as polyethylene, coumarone-indene copolymers and the like, as well as others such as the vinyl polymers. Some materials, such as coal tar, petroleum asphalts, vegetable waxes and the like can also be used, particularly if they are blends of materials with wide molecular weight distributions. All such materials, for my purposes, should be considered to be thermoplastic resins.

Preferably, the resins should be almost completely insoluble in oil or water. Some solubility can, however, be tolerated particularly in shallow wells. Actually, it is only necessary for the resin to be sufficiently insoluble in well fluids for most of the resin to reach the level of the well at which the liner is to be set. Resins meeting this requirement should be considered to be substantially insoluble in oil and water for my purposes.

Except for use in shallow wells, it is preferred that the resin be solid at temperatures below about 120° F. since in many areas temperatures in this range are reached in warehouses where the coated tubes may be stored. It will be apparent, however, that thermoplastic materials can be used which are soft at surface temperature and must be applied and handled in much the same way as the settable resins now being used. The principal difference in such cases is that my resin is not settable and contains finely divided solid particles, preferably of a malleable nature, to prevent flow of the thermoplastic resin.

It will be apparent that soft resins suitable for use in shallow wells can also be used in other cylindrical vessels such as pipelines, pressure tanks or the like. In these applications the greater resistance of the unset resin to vibrations and flexing is important. Still other applications will occur to those skilled in the art.

The finely divided solid particles in the resin are preferably ground nutshells, such as black walnut shells, as previously noted. Other materials which deform without sattering, that is, malleable materials, can be used. These include materials such as copper, lead and the like. The advantage of malleable materials is that when they are squeezed between the liner and well casing, they flatten without shattering to form impermeable gasket-like elements to prevent flow of the resin. This may be independent of any action involving the glass threads in the glass fiber mat. The malleable particles also bridge across and seal any openings remaining in the compressed glass threads. It will be apparent that finely divided brittle solids, such as ground sand, glass, limestone or the like, will help bridge and seal any small openings in the glass fibers; but small particles of malleable solids are preferred because of their superior action both alone and in combination with the glass fibers.

The finely divided particles may also be of flexible or elastic materials, such as natural rubber or preferably of synthetic polymers such as polychloroprene. The important properties are that the rubber or other solid polymer be elastic, insoluble in the resin and remain solid at the temperature of the well where the liner is to be set.

The particle size of the finely divided solid material in the resin can vary over a rather wide range. When ground nutshells are used, the particles should preferably be distributed throughout the range from those barely passing a number 30 sieve to those barely retained on a number 100 sieve of the U.S. Standard Sieve Series. The larger particles are large enough to bridge across any opening which can be anticipated in the compressed glass threads. The smaller particles are small enough to form an effective seal over the larger particles. The seal is particularly effective if the particles are of an elastic or malleable nature.

The openings in a number 30 sieve are about 0.023 inch. When a glass fiber mat of medium weight woven roving is squeezed between the liner and casing, the distance between the liner and casing is usually about 0.025 inch. Thus, if it is desired that the particles be squeezed and flattened between the liner and casing, they should be somewhat larger than those passing a number 30 sieve. For example, those barely passing a number 20 sieve, with openings of about 0.033 inch, may be used. Even larger particles may be used if desired. It is also possible, as previously mentioned, to use very finely divided particles passing a number 100 sieve to prevent excessive flow and possible loss of the resin after it softens, but before the liner tube is expanded.

The concentration of ground nutshells in resin is preferably about 10 percent by weight. Since the density of nutshells is slightly greater than that of epoxy resins, the preferred percent by volume is about 8 or 9 percent. For materials such as copper or lead the percentage by volume should be about the same as for nutshells, but the percent by weight should be much greater to take into account the greater density of the materials. The concentration of finely divided particles in the resin may be as low as about 4 or 5 percent by volume. Lower concentrations are not generally considered advisable since too much flow is required to build up an adequate deposit of the finely divided particles on the glass threads to stop the flow. As much as 30 or 40 percent by volume of finely divided particles can be used, particularly if it is desired to inhibit excessive flow of the resin before the liner is set.

If the casing in which the liner is to be set is fairly smooth and clean, it may not be necessary to use a glass fiber mat. One of the principal functions of the mat is to carry the resin. If the resin is a hard solid at most well temperatures, however, it will be apparent that no glass fiber mat is necessary to carry the resin. It is true that the resin must soften at the well temperature at the level where the liner is to be set, but by the exercise of suitable care in selecting the resin, one can be chosen which remains sufficiently hard and strong to be used without a glass mat. The finely divided particles should be malleable in case no glass mat is used. The reason is that such particles are flattened and squeezed against each other when the liner is set. The result is the formation of a seal between the liner and casing even without a glass mat.

By far the preferred practice is to use the glass mat to provide not only a means for carrying the resin, but also to form compressed glass thread barriers against which the finely divided particles can bridge to stop flow of the resin. The preferred form of glass fiber mat is known as woven roving. Other forms in which glass threads or fibers are held together in mat form by an adhesive, for example, can also be used.

Whether a glass mat is used or not, the thickness of the resin coating on the corrugated tube is ordinarily about $\frac{1}{16}$ to $\frac{1}{8}$ inch. Actually, a thinner layer is adequate but is difficult to apply. A thicker layer may also be used but is not necessary and has the disadvantage of providing an excess of resin.

As explained in more detail in S.N. 216,949 Vincent, the maximum cross-sectional dimension of the corrugated liner tube must be less than the internal diameter of the casing. This is so the liner can be run into the casing. After the liner is reformed into cylindrical form within the casing it is to be in maximum compressive hoop stress. This means that the external cross-sectional periphery of the corrugated tube must be larger than the internal cross-sectional circumference of the casing.

If the liner is in maximum compressive stress, the casing must be in sufficient tensile stress to hold the liner in maximum compressive stress. If both casing and liner are of the same metal, this simply means that the casing must be thicker than the liner or the maximum tensile strength of the casing will be exceeded and the casing will burst. If the metal of the casing is different from that in the liner, then the maximum compressive strength of the material of which the liner is made times the wall thickness of the liner must be less than the maximum tensile strength of the material of which the casing is made times the thickness of the casing.

The liner is most useful in sealing holes in well casing. The holes may be caused by corrosion or by bullet or jet perforators, for example. The liner may also be used to reinforce corroded casing sections which have not yet become perforated. Still other applications, such as bridging the gap between sections of parted casing and others described in Vincent application 216,949 will also be apparent to those skilled in the art.

A well in Mississippi had been cased and perforated. It was desired to seal these perforations and make others. The perforations were at a well depth of about 10,609 to about 10,612 feet. It was estimated that about 6 to 8 hours would be required to run a liner into the well on tubing with available equipment. The bottom hole temperature was estimated to be about 215° F. It was feared that the combination of long running time and high temperature might result in premature setting of a settable resin.

A mixture of unmodified epoxy resins melting a little above this temperature was used together with about 10 percent of an epoxy plasticizer to increase the flexibility of the resin mixture and lower the softening point. The resin contained about 15 percent by weight of ground nutshells. This amounted to about 12 percent by volume. The nutshells were distributed throughout the range from those barely passing a number 30 sieve to those barely retained on a number 100 sieve. In an ASTM ball and ring test of this mixture, first softening was noted at about 192° F. At about 218° F. the ball had penetrated the resin to a depth of about 3/16 inch. At about 234° F. the ball dropped.

The resin-nutshell mixture was melted, applied to a woven roving glass cloth coating on an 18 foot longitudinally corrugated steel tube and allowed to solidify. The tube and expanding assembly were then lowered into the well and expanded at the level from 10,602 to 10,620 feet. The tube was permitted to stand for one hour at the location where it was to be set, before expanding, to be sure that the resin had softened properly. After the liner was set, it was tested to a pressure of 2700 p.s.i. and did not leak.

In another well a 20 foot patch was set at about 11,200 feet to seal perforations. In this case a single unmodified epoxy resin melting at about 300° F. was used together with about 10 percent of the plasticizer and about 12 percent by volume of 30 to 100 mesh ground nutshells. This resin softened sufficiently at the well temperature of about 240° F. to be satisfactorily used. Here again, the liner was set and proved to be successful upon pressure testing.

I claim:

1. An article of manufacture suitable for expansion to form a liner for casing in wells, comprising a longitudinally corrugated tube of malleable metal coated on the exterior surface with a mat of glass fibers filled with a thermoplastic resin which is solid at surface storage temperatures but which softens at the temperature at which it is to be used in a well, said resin containing dispersed therein from about 4 to about 40 percent by volume of finely divided particles of a material insoluble in said resin and solid at the temperatures at which it is to be used in said well.

2. The article of manufacture of claim 1 in which said particles are of a malleable material.

3. The article of manufacture of claim 2 in which said malleable material is nutshells and said thermoplastic resin is an unmodified epoxy resin.

4. An article of manufacture suitable for expansion to form a liner for casing in wells, comprising a longitudinally corrugated tube of malleable metal coated with a thermoplastic resin which is solid at surface storage temperatures but which softens at the temperature at which it is to be used in a well, said resin containing finely divided particles of a malleable material dispersed in the resin.

5. The article of manufacture of claim 4 in which said malleable material is nutshells and said resin is unmodified epoxy resin.

6. Apparatus for placing a metallic liner inside a cylindrical vessel comprising a longitudinally corrugated tube of malleable metal, the external cross-sectional perimeter of said tube being greater than the internal circumference of said vessel, and the wall thickness of said tube times the maximum compressive strength of the metal of which said tube is made being less than the wall thickness of said vessel times the maximum tensile strength of the metal of which said vessel is made, a glass fiber mat surrounding said tube, said mat being saturated with a material which is a viscous liquid under the conditions where said liner is to be placed, the material saturating said mat having dispersed therein from about 4 to about 40 percent by volume of finely divided particles of a material which is solid at the temperature at which it is to be used in said vessel and which is insoluble in the mat-saturating material, means for placing said tube in said vessel, and means for reforming said tube into substantially cylindrical shape within said vessel without imposing a tensile stress in the wall of said vessel in excess of the maximum tensile strength of the metal of which said vessel is made.

7. The apparatus of claim 6 in which said particles are of a malleable material.

8. The apparatus of claim 7 in which said malleable material is nutshells and said mat-saturating material is an unmodified epoxy resin.

9. Apparatus for placing a metallic liner inside casing in a well comprising a longitudinally corrugated tube of malleable metal, the external cross-sectional perimeter of said tube being greater than the internal circumference of said casing, and the wall thickness of said tube times the maximum compressive strength of the metal of which said tube is made being less than the wall thickness of said casing times the maximum tensile strength of the metal of which said casing is made, a glass fiber mat surrounding said tube, said mat being saturated with a material which is a viscous liquid at the well level at which said liner is to be placed, the material saturating said mat having dispersed therein from about 4 to about 40 percent by volume of finely divided particles of a material which is solid at the temperature at which it is to be used in said well and which is insoluble in the mat-saturating material, means for lowering said tube into said well to the desired level, and means for reforming said tube into substantially cylindrical shape within said casing without imposing a tensile stress in the wall of said casing in excess of the maximum tensile strength of said casing.

10. The apparatus of claim 9 in which said particles are of a malleable material.

11. The apparatus of claim 10 in which said malleable material is nutshells and said mat-saturating material is an unmodified epoxy resin.

12. The apparatus of claim 9 in which the material which saturates said glass fiber mat is a thermoplastic resin which is solid at surface storage temperatures but which softens at the temperature of the well at the level where the liner is to be set.

13. The apparatus of claim 12 in which said malleable material is nutshells and said resin is an unmodified epoxy resin.

14. The apparatus of claim 12 in which said particles are of a malleable material.

15. The apparatus of claim 13 in which said malleable material is nutshells and said mat-saturating material is an unmodified epoxy resin.

16. Apparatus for placing a metallic liner inside casing in a well comprising a longitudinally corrugated tube of malleable metal, the external cross-sectional perimeter of said tube being greater than the internal circumference of said casing, and the wall thickness of said tube times the maximum compressive strength of the metal of which said tube is made being less than the wall thickness of said casing times the maximum tensile strength of the metal of which said casing is made, a coating on the outside of said tube, said coating consisting essentially of a thermoplastic resin which is solid at surface storage temperatures, but which softens at the temperature of the well at the level where said liner is to be set, said resin having dispersed therein from about 4 to about 40 percent by volume of finely divided particles of a malleable material which is solid at the temperature at which it is to be used in said well and which is insoluble in said resin, means for lowering said tube into said well to the desired level, and means for reforming said tube into substantially cylindrical shape within said casing without imposing a tensile stress in the wall of said casing in excess of the maximum tensile strength of said casing.

References Cited by the Examiner

UNITED STATES PATENTS

| | | | |
|---|---|---|---|
| 2,804,147 | 8/1957 | Pistole et al. | 166—14 |
| 3,028,915 | 4/1962 | Jennings | 166—33 |
| 3,111,991 | 11/1963 | O'Neal | 166—207 |
| 3,134,442 | 5/1964 | Jennings | 166—207 |

CHARLES E. O'CONNELL, *Primary Examiner.*

J. A. LEPPINK, *Assistant Examiner.*